US 8,508,088 B2

(12) United States Patent
Sugiyama et al.

(10) Patent No.: US 8,508,088 B2
(45) Date of Patent: Aug. 13, 2013

(54) WIRING COMPONENT FOR MOTOR COIL

(75) Inventors: Toshiya Sugiyama, Okazaki (JP); Jun Abiko, Kariya (JP); Yasutoshi Yamada, Chita-gun (JP); Hiroyuki Nagata, Kariya (JP)

(73) Assignee: Aisin Seiko Kabushiki Kaisha, Kariya-shi, Aichi-ken (JP)

( * ) Notice: Subject to any disclaimer, the term of this patent is extended or adjusted under 35 U.S.C. 154(b) by 830 days.

(21) Appl. No.: 12/609,245

(22) Filed: Oct. 30, 2009

(65) Prior Publication Data

US 2010/0109456 A1 May 6, 2010

(30) Foreign Application Priority Data

Oct. 31, 2008 (JP) ................................. 2008-280668

(51) Int. Cl.
*H02K 11/00* (2006.01)
*H02K 3/00* (2006.01)
*H02K 3/46* (2006.01)

(52) U.S. Cl.
USPC .............. 310/71; 310/179; 310/260; 310/270

(58) Field of Classification Search
USPC .................................... 310/71, 179, 260, 270
See application file for complete search history.

(56) References Cited

U.S. PATENT DOCUMENTS

| 5,900,687 | A | 5/1999 | Kondo et al. | |
| 7,034,419 | B2* | 4/2006 | Kabasawa et al. | 310/71 |
| 7,045,920 | B2* | 5/2006 | Ohuchi et al. | 310/71 |
| 7,164,217 | B2* | 1/2007 | Kabasawa et al. | 310/71 |
| 7,262,529 | B2* | 8/2007 | Klappenbach et al. | 310/71 |
| 2004/0066103 | A1* | 4/2004 | Ohuchi et al. | 310/71 |

FOREIGN PATENT DOCUMENTS

| JP | H01-180875 U | | 12/1989 |
| JP | 05300687 A | * | 11/1993 |
| JP | H05-300687 A | | 11/1993 |
| JP | H10-248187 A | | 9/1998 |
| JP | 3430839 B2 | | 7/2003 |
| JP | 2004-080962 A | | 3/2004 |

(Continued)

OTHER PUBLICATIONS

Extended European Search Report issued on Oct. 20, 2011 by the European Patent Office in corresponding European Patent Application No. 09 17 4306.
Official Action issued by Japanese Patent Office on Jan. 18, 2013 in Japanese Application No. 2008-280668, and English language translation of Official Action (9 pgs).

*Primary Examiner* — Tran Nguyen
*Assistant Examiner* — Jose Gonzalez Quinones
(74) *Attorney, Agent, or Firm* — Buchanan Ingersoll & Rooney P.C.

(57) ABSTRACT

A wiring component for a motor coil includes: a wire coil configured by a plurality of wire segments arranged in a circumferential direction so as to form a ring shape, each of the wire segments including an arc-shaped main-body portion made of a conductive wire rod bent in an arc shape, protruding portions formed at both end portions of the main-body portion and upright portions respectively formed at end portions of the protruding portions; an inner clip formed with a plurality of first holding portions at an outer circumferential surface of the inner clip; and an outer clip formed with a plurality of second holding portions at an inner circumferential surface of the outer clip. The inner clip and the outer clip are connected to each other so as to hold the wire coil between the first holding portions and the second holding portions.

16 Claims, 10 Drawing Sheets

(56) References Cited

FOREIGN PATENT DOCUMENTS

| | | |
|---|---|---|
| JP | 2005-45903 A | 2/2005 |
| JP | 2005-160137 A | 6/2005 |
| JP | 3701639 B2 | 10/2005 |
| JP | 2006-280155 A | 10/2006 |
| JP | 2007-259523 A | 10/2007 |
| JP | 2007-259642 A | 10/2007 |
| JP | 2007295698 A * | 11/2007 |
| JP | 2008-061345 A | 3/2008 |

* cited by examiner

F I G. 2
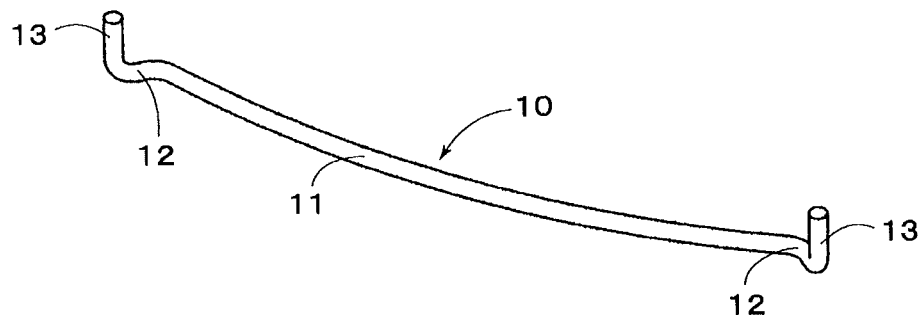
F I G. 3
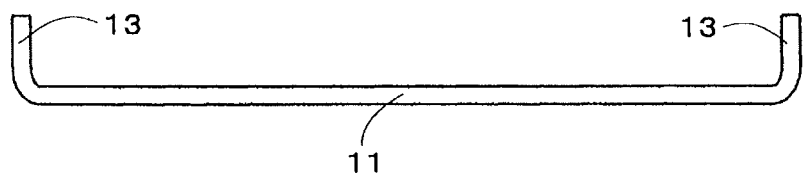
F I G. 4
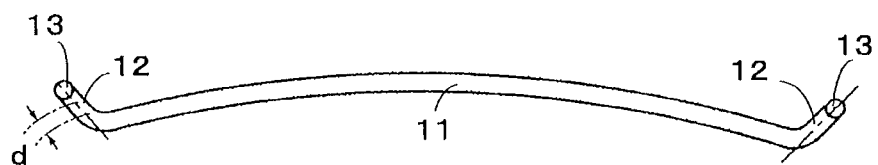

WIRING COMPONENT FOR MOTOR COIL

CROSS REFERENCE TO RELATED APPLICATIONS

This application is based on and claims priority under 35 U.S.C. §119 to Japanese Patent Application 2008-280668, filed on Oct. 31, 2008, the entire content of which is incorporated herein by reference.

TECHNICAL FIELD

This disclosure relates to a wiring component for a motor coil.

BACKGROUND

As a wiring component for a motor coil, various configurations of wiring components for connecting a plurality of field coils are known, in terms of, for example, motor coils of an electric motor of a hybrid vehicle and the like. For example, JP3701639B2 discloses a lead frame and a power distribution component using the same, aiming to suppress material loss at the time of manufacturing and distortion due to thermal expansion. According to a wiring component of an electric motor, having the lead frame for connecting same-phase motor coils, the lead frame is made of at least one linear conductor, which is coated by an insulating material, so as to be integrally formed into a substantially ring shape. The lead frame is bent to form a terminal portion, which protrudes in a radially inner direction of the lead frame so as to be connected to a winding end of each of the motor coils. Such lead frame is provided for a U-phase, a V-phase and a W-phase, and the lead frames are arranged so as to overlap in an axial direction. Further, the lead frames are integrally fixed in a state where the lead frames overlap each other by means of fixing means, which are partially arranged.

JP3430839B2 discloses a connection structure of a stator, aiming to provide a rational connection structure for an inner-rotor-type stator, around which coil windings are wound on the basis of the number of teeth of the stator. According to the stator, around which the coil windings are wound on the basis of the numbers of stator iron cores, the connection structure of the stator includes: the same-phase coil windings, wound on the basis of the numbers of the teeth of the stator; electric conductor, made of an electric wire coated with an insulating material and formed by a bending process; an end plate, arranged at the coil windings and having grooves for guiding the conductors; and connecting terminals. Further, the electric conductor includes a connecting portion, which protrudes from the end plate in a radially outer direction. The connecting portion is arranged in parallel with an end portion of each of the coil windings, so that the connecting portion and the end portion of each of the coil windings are connected to each other via the connecting terminal.

According to the wiring component for the motor coil disclosed in JP3701639B2, the terminal portion, which is made of the linear conductor so as to be formed integrally with the lead frame, and which is connected to the winding end of each of the motor coils, is formed by a bending process. However, in order to form the terminal portion integrally with the lead frame, a bending process may become complicated. Further, because split frame parts are separately formed, a linear conductor, which is formed into a different shape, may be required in order to form a power supplying portion. According to JP3701639B2, both ends of each of the split frame parts are bent in a radially inner direction so as to dispose an end portion of a coil wire between the adjacent split frame parts in order to connect coils relative to each other. However, due to variation, which may be generated at the time of producing, and misalignment, which may occur at the time of assembly, it may be difficult to appropriately arrange the coil wire between the split frame parts. Furthermore, positions where bus rings are connected to the corresponding coils are displaced in an axial direction, depending on phases, therefore the connection may become difficult. On the other hand, according to the connection structure disclosed in JP3430839B2, the electric conductor extends from an intermediate side to an outer side of the end plate, and further the electric conductor protrudes from the end plate in the radially outer direction. Therefore, a size of the connection structure may be enlarged in a radial direction, and accordingly, downsizing may be difficult. According to either JP3701639B2 or JP3430839B2, the fixing means, the end plates and the like for holding the coil wires and the electric conductor, are large either in number or in size. Accordingly, manufacturing, assembly, wiring and the like may not become difficult.

A need thus exists for a wiring component for a motor coil, which is not susceptible to the drawback mentioned above

SUMMARY

According to an aspect of this disclosure, a wiring component for a motor coil includes a wire coil configured by a plurality of wire segments arranged in a circumferential direction so as to form a ring shape, each of the wire segments including an arc-shaped main-body portion made of a conductive wire rod bent in an arc shape, protruding portions formed at both end portions of the main-body portion in a manner of bending both end portions of the main-body portion in a radial direction, and upright portions respectively formed at end portions of the protruding portions in a manner of bending one of end portions of each of the protruding portions at positions where the protruding portions protrude in a radial direction by a length longer than a diameter of the conductive wire rod, so that the upright portions protrude in a direction vertical relative to a planar surface including the main-body portion; an inner clip formed with a plurality of first holding portions at an outer circumferential surface of the inner clip; and an outer clip formed with a plurality of second holding portions at an inner circumferential surface of the outer clip. The inner clip and the outer clip are connected to each other so as to hold the wire coil between the first holding portions and the second holding portions.

According to another further aspect of this disclosure, a wiring component for a motor coil includes a coil connected to a motor coil, an inner clip arranged at an inner side of the coil, and an outer clip arranged at an outer side of the coil. The coil is held between the inner clip and the outer clip.

BRIEF DESCRIPTION OF THE DRAWINGS

The foregoing and additional features and characteristics of the disclosure will become more apparent from the following detailed description considered with the reference to the accompanying drawings, wherein:

FIG. 2 is a perspective view illustrating a wire segment according to the embodiment;

FIG. 3 is a front view illustrating the wire segment according to the embodiment;

FIG. 4 is a planar view illustrating the wire segment according to the embodiment;

DETAILED DESCRIPTION

Figure 11:
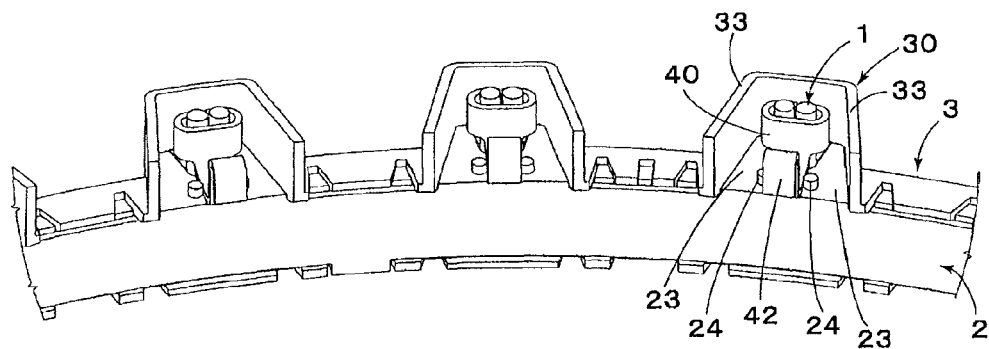
FIG. 11 is a perspective view illustrating a sub-assembly according to the embodiment, where wire coil is connected in a manner where the wire coil is held between the inner clip and the outer clip.
Figure 12:
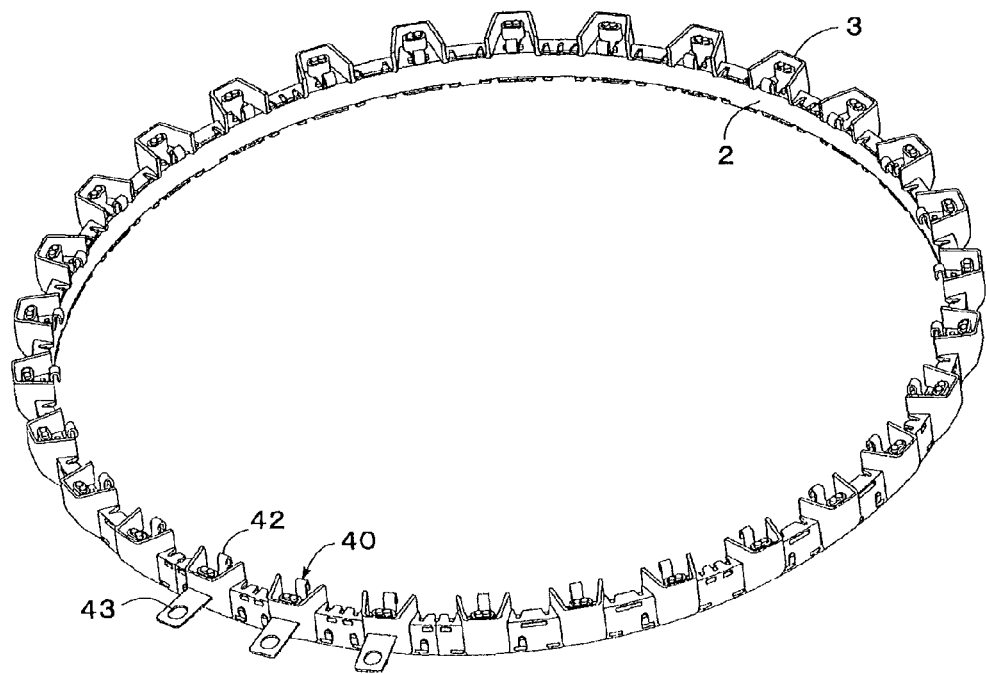
FIG. 12 is a perspective view illustrating an entire structure of the wiring component for the motor coil.

An embodiment of a wiring component for a motor coil will be described hereinafter with reference to the attached drawings. FIG. 12 is a perspective view illustrating an entire structure of the wiring component for the motor coil. Components and a sub-assembly are illustrated in FIGS. 1 through 11. The components include a plurality of substantially ring-shaped first, second and third wire coils (coils) $1u,1v,1w$ (three wire coils are provided according to the embodiment), a substantially cylindrical-shaped inner clip 2 and a substantially cylindrical-shaped outer clip 3. The wire coils $1u,1v,1w$ are made of a conductive wire rod. The inner clip 2 is formed with first, second and third ring-shaped first, second and third grooves $2u,2v$ and $2w$ (first holding portions) at an outer circumferential surface thereof to respectively hold the first, second and third wire coils $1u,1v$ and $1w$. The outer clip 3 is formed with ring-shaped first, second and third projecting portions $3u,3v$ and $3w$ (second holding portions) at an inner circumferential surface thereof to respectively hold the first, second and third wire coils $1u,1v$ and $1w$. When the first, second and third projecting portions $3u,3v$ and $3w$ of the outer clip 3 engage with the corresponding first, second and third grooves $2u,2v$ and $2w$ of the inner clip 2, the first, second and third wire coils $1u,1v$ and $1w$ are held between the first, second and third grooves $2u,2v$ and $2w$ and the protruding portions $3u,3v,3w$, thereby an assembly of wiring components is configured. Each of the wiring components will be described hereinafter.

Each of the first, second and third wire coils $1u,1v$ and $1w$ ("the first, second and third wire coils $1u,1v$ and $1w$" are referred to as "wire coil 1" hereinafter) is configured by a plurality of wire segments 10 (see FIGS. 2 through 4), which are arranged to form a substantially ring shape. Each of the wire segments 10 is formed with an arc-shaped main-body portion 11, protruding portions 12, 12 and upright portions 13, 13. An enamel wire (a conductive wire rod), for example, is bent into an arc-shape to form the main-body portion 11. Both end portions of the main-body portion 11 are bent in the radial direction (in a radially outer direction in FIG. 4) of the wire coil 1 to form the protruding portions 12, 12. Further, one of end portions of each of the protruding portions 12, 12 is bent at positions where the protruding portions 12, 12 protrude in the radial direction of the wire coil 1 by a length longer than a diameter (d) of the wire rod, in a direction vertical relative to a planar surface including the main-body portion 11, thereby the upright portions 13, 13 are formed.

The inner clip 2 is configured by a plurality of resin-made inner clip segments 20 (first members, arc-shaped segments) (see FIGS. 5 and 6) that are arranged and connected to each other to form a substantially cylindrical shape. Each of the inner clip segments 20 is formed with first, second and third first, second and third grooves $20u,20v$ and $20w$ at an outer circumferential surface thereof. Further, multiple pairs of third holding portions 23, 23 are formed at each of the inner clip segments 20. The third holding portions 23, 23 extend from an inner side to an outer side of the wire coil 1 in the radial direction thereof, relative to the upright portions 13, 13, at which the adjacent wire segments 10 contact each other in the circumferential direction of the wire coil 1. Protrusions 24 and engagement portions 25 will be described later.

Figure 8:
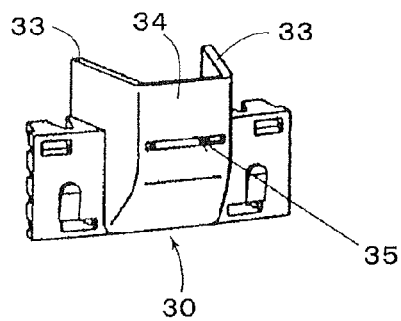
FIG. 8 is a perspective view illustrating the outer clip segment according to the embodiment, seen from the radially outer direction of the outer clip.
Figure 9:
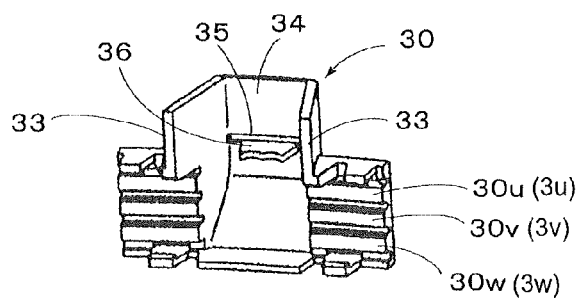
FIG. 9 is a perspective view illustrating the outer clip segment according to the embodiment, seen from a radially inner direction of the outer clip.

The outer clip 3 is configured by a plurality of resin-made outer clip segments 30 (second members, arc-shaped segments) (see FIGS. 7 through 9), which is arranged and connected to each other to form a substantially cylindrical shape. As illustrated in FIG. 9, each of the outer clip segments 30 is formed with first, second and third projecting portions $30u$, $30v$ and $30w$ at an inner circumferential surface thereof. Further, multiple pairs of vertical wall portions (sandwiching portions) 33, 33 are formed at each of the outer clip segments 30. The vertical wall portions 33, 33 extend from the outer side to the inner side of the wire coil 1 in the radial direction thereof, relative to the upright portions 13, 13, at which the adjacent wire segments 10 contact each other in the circumferential direction of the wire coil 1 so as to sandwich the corresponding pairs of third holding portions 23, 23 from both sides thereof in the circumferential direction of the wire coil 1. Further, the vertical wall portions 33, 33 extend in a substantially vertical direction, relative to the planar surface including the main-body portion 11 of the wire segment 10.

Figure 1:
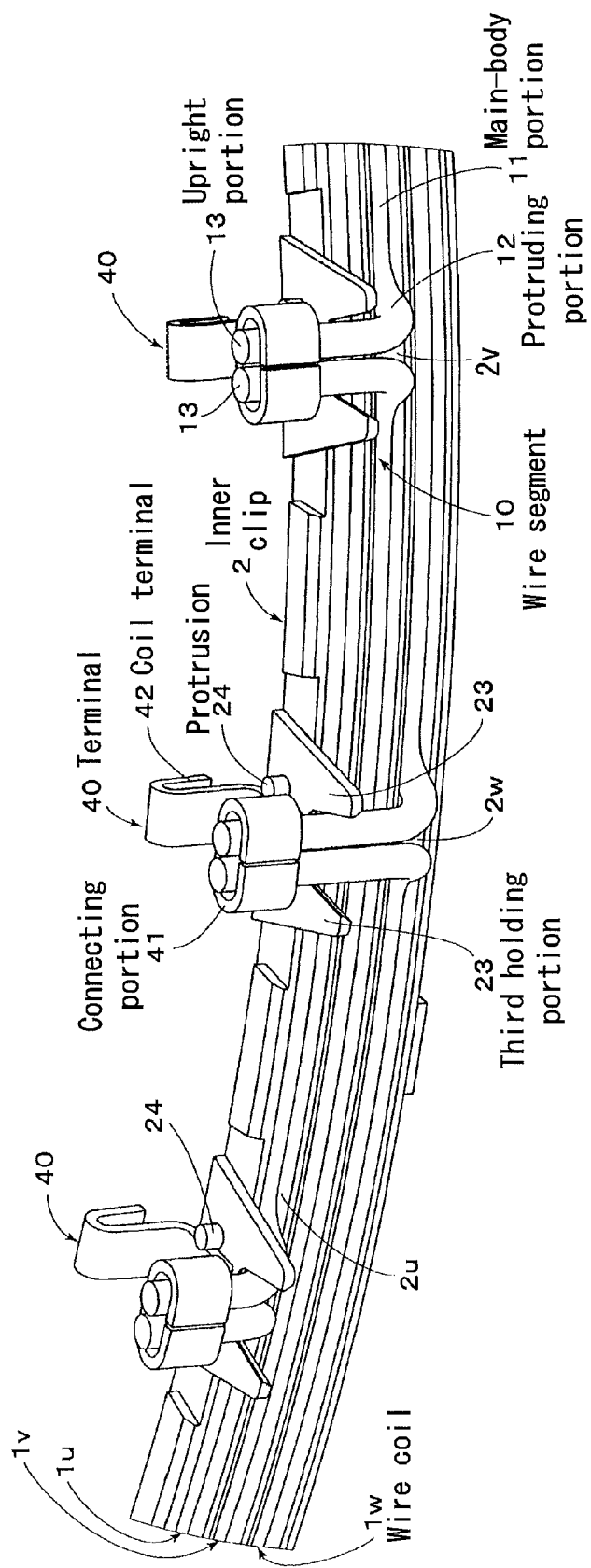
FIG. 1 is an enlarged perspective view illustrating a sub-assembly of wiring components according to an embodiment.

The first wire coil $1u$ is configured in a manner where a plurality of wire segments 10 is engaged into the first groove $2u$ of the inner clip 2 so as to form a ring shape. Likewise, the second and third wire coils $1v,1w$ are configured in a manner where a plurality of wire segments 10 are engaged into the second and third grooves $2v$ and $2w$ of the inner clip 2 so as to form a ring shape. As described above (see FIG. 4), the end portions of the protruding portions are bent at the positions where the protruding portions 12 protrude in the radial direction of the wire coil 1 by the length longer than the diameter (d) of the wire rod, and thereby the upright portions 13 are formed. Therefore, when the second and third wire coils $1u$ and $1v$ are formed as illustrated in FIG. 1, the upright portions 13 do not contact outer circumferential surfaces of the first, second and third wire coils 1u,1v and 1w, and a thickness of the upright portions 13 is set to be smallest. Further, the upright portions 13 extend in an axial direction of the wire segments 10. Therefore, enamel coating may easily be removed at the time of electrical connection.

According to the embodiment, extending lengths in a vertical direction of the upright portions 13, 13, at which the adjacent wire segments 10 contact each other in the circumferential direction thereof, are set to vary, depending on positions where the wire segments 10 are attached to the first, second and third grooves 2u,2v and 2w of the inner clip 2. In other words, as illustrated in FIG. 10, the upright portions 13 are set to be the same height relative to the planar surface including the main-body portions 11 of the wire segments 10 of the wire coil 1 (the first wire coil 1u in FIG. 1), arranged to be closest to a side of the upright portions 13 in an axial direction of the wire coil 1 when the first, second and third wire coils 1u,1v and 1w are attached to the inner clip 2.

Figure 10:
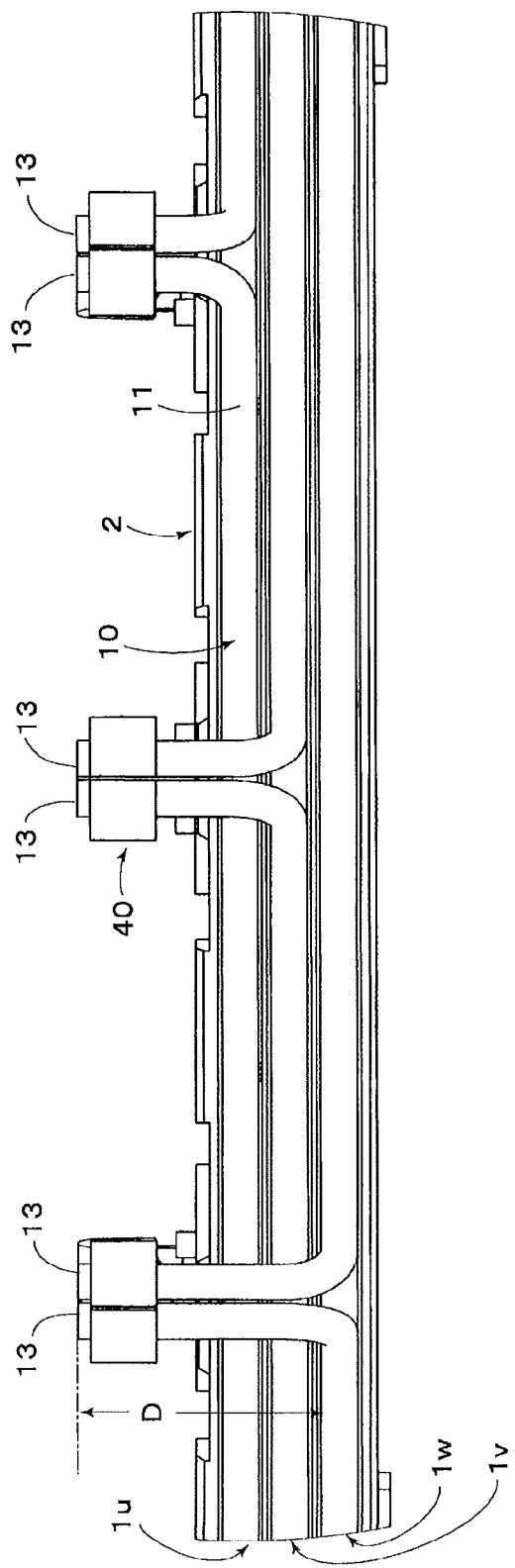
FIG. 10 is a front view illustrating a sub-assembly according to the embodiment, where the plurality of wire segments are attached to the inner clip.

Alternatively, the extending lengths of the upright portions 13, 13, at which the adjacent wire segments 10 contact each other, may be set to be a predetermined length or more (for example, a predetermined length D shown in FIG. 10 or more). Then, each of the upright portions 13, 13 may be cut to be the predetermined length (D) so that each of the upright portions 13, 13 becomes the same height relative to the planar surface including the wire segments 10 of the wire coil 1 (the first wire coil 1u in FIG. 1), arranged to be closest to a side of the upright portions 13 in the axial direction of the wire coil 1 when the first, second and third wire coils 1u,1v and 1w are attached to the inner clip 2.

Further, as illustrated in FIG. 1, a plurality of terminals 40 is attached to each of the first, second and third wire coils 1u,1v and 1w. Each of the terminals 40 includes a connecting portion 41 for electrically connecting the adjacent upright portions 13, 13 to the terminal 40, and a coil terminal (an extending portion) 42, extending from the connecting portion 40 in the radial direction of the wire coil 1. End portions of the wire coil 1 and the connecting portions 41 are riveted, fused, welded and the like, to be electrically connected. The coil terminals 42 extend in the radially inner direction of the wire coil 1 so as to be electrically connected to coil components (motor coils). Thus, the wire segments 10 are connected to each other by means of the connecting portions 41 of the terminals 40, while the wire segments 10 are connected to the coil components by means of the coil terminals 42. Therefore, even when misalignment may occur among the wire segments 10, the misalignment may be absorbed by means of the connecting portions 41 of the terminals 40.

Figure 7:
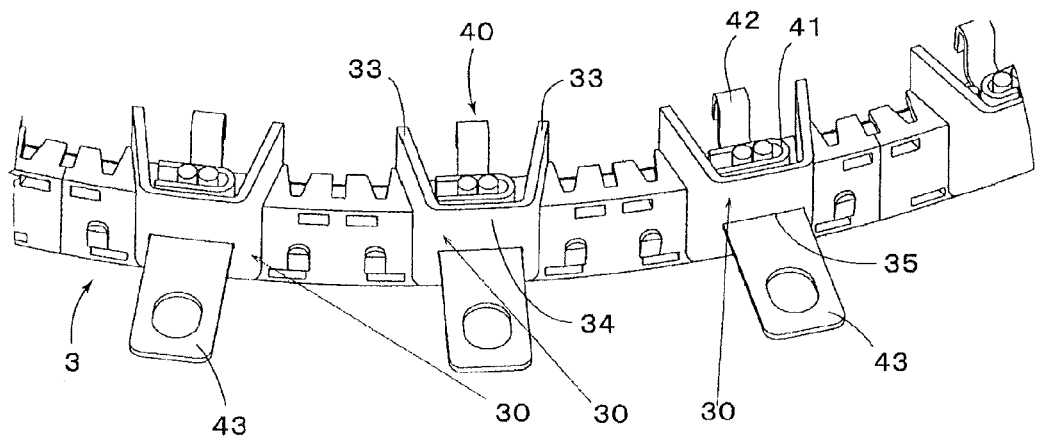
FIG. 7 is a perspective view illustrating an outer clip segment according to the embodiment, seen from a radially outer direction thereof.

Furthermore, as illustrated in FIG. 7, three of the terminals 40 respectively include outer terminals (an extending portion) 43, extending in the radially outer direction of the wire coil 1 so as to be electrically connected to external components. According to the embodiment, the outer terminals 43 are formed integrally with the terminals 40. Alternatively, the outer terminals 43 may be separately formed. As illustrated in FIG. 1, only the connecting portions 41 of the terminals 40 (i.e. the protruding portions 12 and the upright portions 13 of the wire segments 10) extend outer than an outer circumference of the cylindrical shape, formed by the first, second and third wire coils 1u,1v and 1w. Therefore, less space is required. Accordingly, spaced portion, generated at a portion other than positions of the protruding potions 12 and the upright portions 13 of the wire segments 10, may be utilized to arrange fixing bolts and the like.

With regard to the aforementioned outer clip 3 and the terminals 40, each of the outer clip segments 30 includes, as illustrated in FIG. 7, circumferential wall portions 34 and the pairs of vertical wall portions 33, 33. Each of the pairs of vertical wall portions 33, 33 and each of the circumferential wall portions 34 are arranged so as to form a substantially U shape, which opens toward a radially inner direction of the outer clip segments 30, when seen in a planar view. Alternatively, as illustrated in FIGS. 8 and 9, each of the outer clip segments 30 may be separately formed into a substantially U shape, which is formed by each of the pairs of vertical wall portions 33, 33 and each of the outer circumferential wall portions 34. Further, a through-hole 35, through which each of the outer terminals 43 is inserted, is formed at the outer circumferential wall portion 34. Furthermore, a fourth holding portion 36 (see FIG. 9) is formed at an inner surface of each of the outer wall portions 34 to be in the vicinity of the through-hole 35. The fourth holding portion 36 press-fits the upright portions 13.

Figure 5:
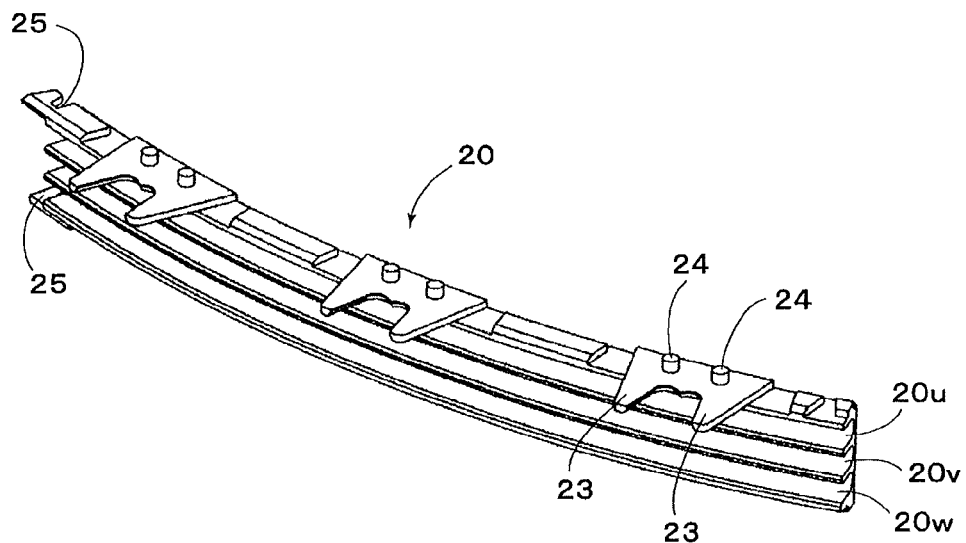
FIG. 5 is a perspective view illustrating an inner clip segment according to the embodiment, seen from a radially outer direction thereof.
Figure 6:
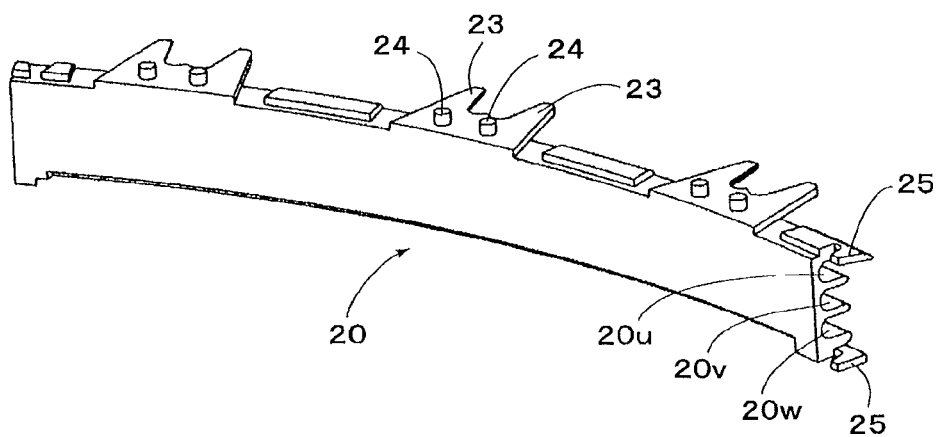
FIG. 6 is a perspective view illustrating the inner clip segment according to the embodiment, seen from a radially inner direction thereof.

With regard to the terminals 40, as illustrated in FIGS. 5 and 6, each of the pairs of protrusions 24, 24, protruding from both sides of each of the coil terminals 42, is formed at a surface of each of the pairs of third holding portions 23, 23. Each of the coil terminals 42 of the terminals 40 is respectively arranged between each of the pairs of the protrusions 24, 24. As illustrated in FIG. 11, when the wire coil 1 is connected in a manner where the wire coil 1 is held between the inner clip 2 and the outer clip 3, as illustrated in FIG. 12, the assembly of the wiring components is configured. According to FIG. 12, the inner clip 2 is integrally formed to form the ring shape and the outer clip 3 is integrally formed to form the ring shape. However, as described in FIGS. 5 through 9, the inner clip segments 20, which are formed by splitting the inner clip 2 in the circumferential direction thereof, may be arranged into the cylindrical shape so as to form the inner clip 2. Likewise, the outer clip segments 30, which are formed by splitting the outer clip 3 in the circumferential direction thereof, may be arranged into the cylindrical shape so as to form the outer clip 3. In such manner, a mold for resin molding is downsized, and consequently less cost is required. Shapes of each of the inner clip segments 20 and that of each of the outer clip segments 30 being suitable for resin molding will be described hereinafter.

Figure 13:
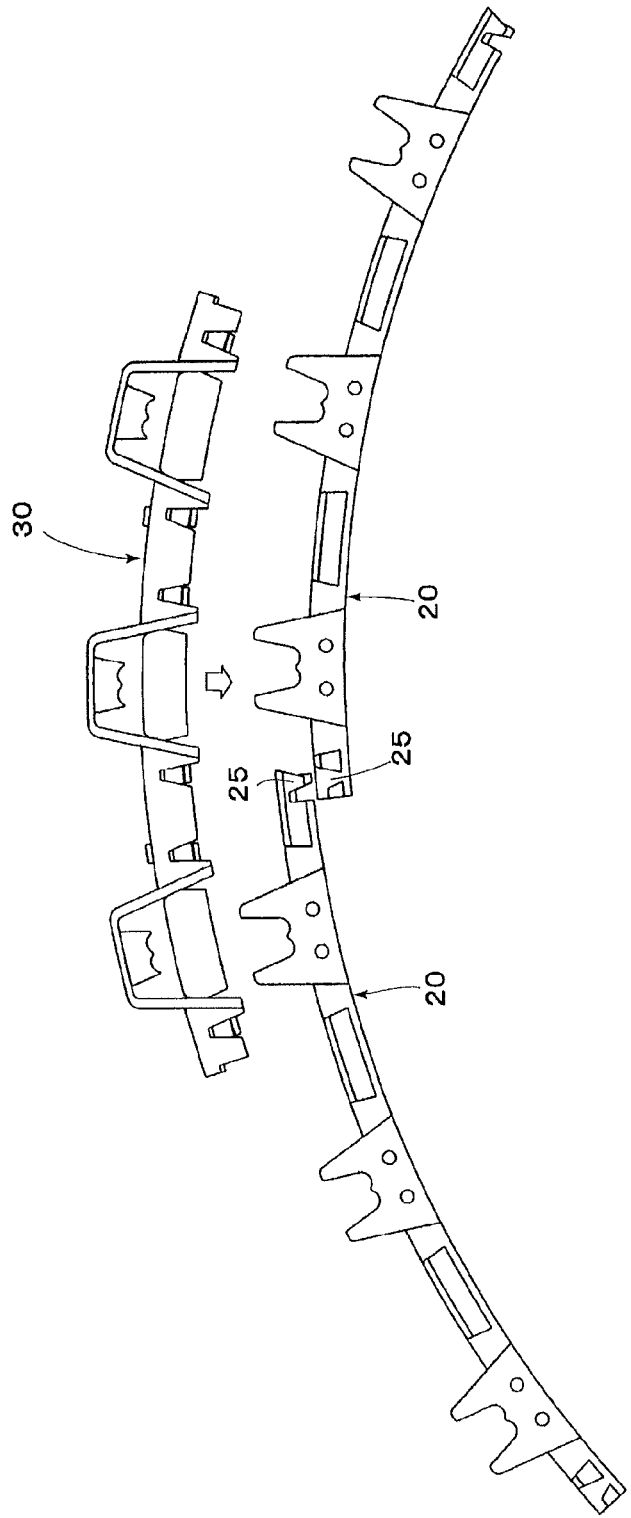
FIG. 13 is a planar view illustrating a state before the inner clip segments and the outer clip segments are connected, according to the embodiment.
Figure 14:
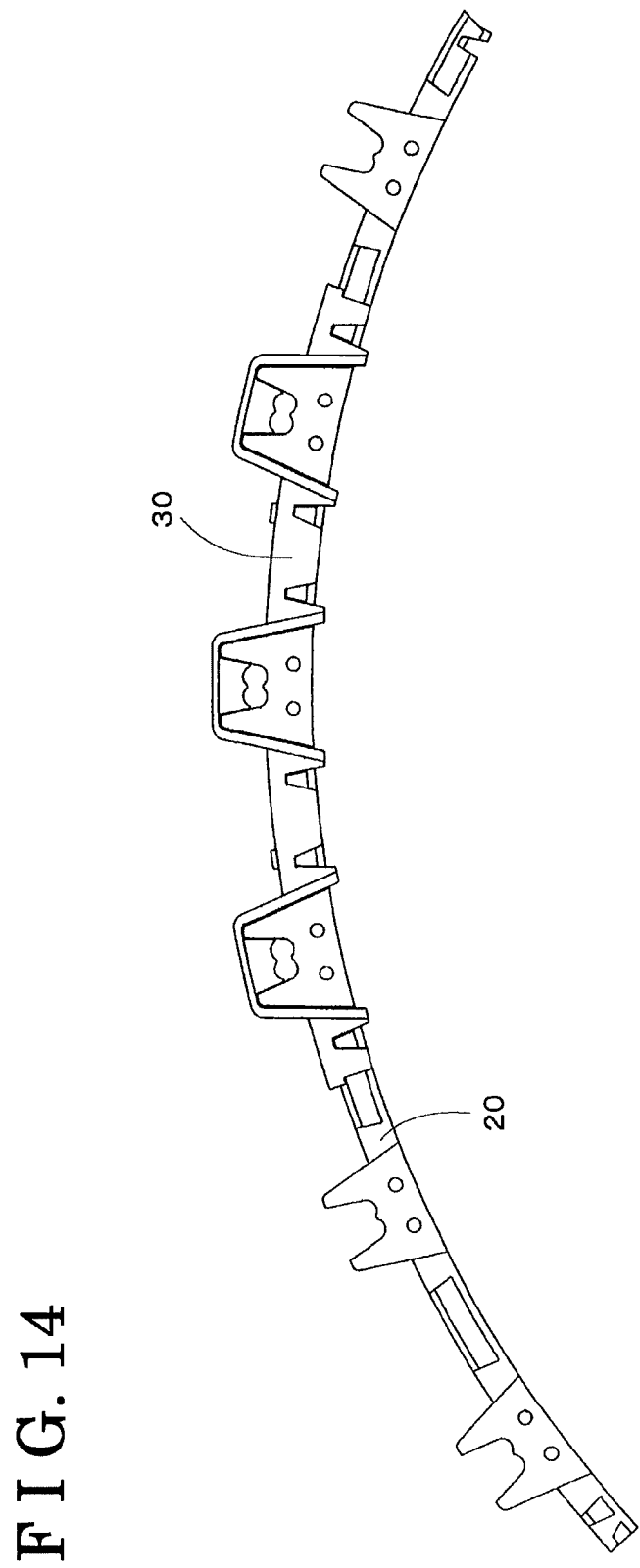
FIG. 14 is a planar view illustrating a state after the inner clip segments and the outer clip segments are connected, according to the embodiment.

FIGS. 13 and 14 illustrate a state before and after the inner clip segments 20 and the outer clip segments 30 are connected. The plurality of arc-shaped inner clip segments 20 is connected to each other to form a ring shape, and the plurality of arc-shaped outer clip segments 30 is connected to each other to form a ring shape. The outer clip segments 30 are arranged so as to cover connecting portions of the inner clip segments 20 where the adjacent inner clip segments 20 are connected to each other. Each of the inner clip segments 20 is integrally formed with the engagement portions 25 at both end portions thereof. Configurations of the engagement portions 25 are illustrated in FIGS. 5 and 6. More specifically, one end of each of the inner clip segments 20 in the circumferential direction thereof is formed with a projection and the other end thereof is formed with a recess. The inner clip segments 20, being adjacent to each other in the circumferential direction, are connected to each other by engagement between the projection and the recess thereof. Further, each of the outer clips 30 may be formed with a similar engagement portion so as to be connected to each other.

The inner clip segments 20 are thus connected to each other via the engagement portions 25 so as to form the cylindrically-shaped sub-assembly of the inner clip 2. Therefore, the plurality of the wire segments 10 may easily be attached to the inner clip 2, and the ring-shaped wire coil 1 may be held at the corresponding first, second and third grooves 2u,2v and 2w (for example, the first groove 2u). Thus, the wire coil 1 is attached to the sub-assembly of the inner clip 2, and consequently, the sub-assembly shown in FIG. 1 is configured. Subsequently, the plurality of the outer clip segments 30 are connected to the sub-assembly, and the sub-assembly of the wiring components shown in FIG. 12 is configured.

Figure 15:
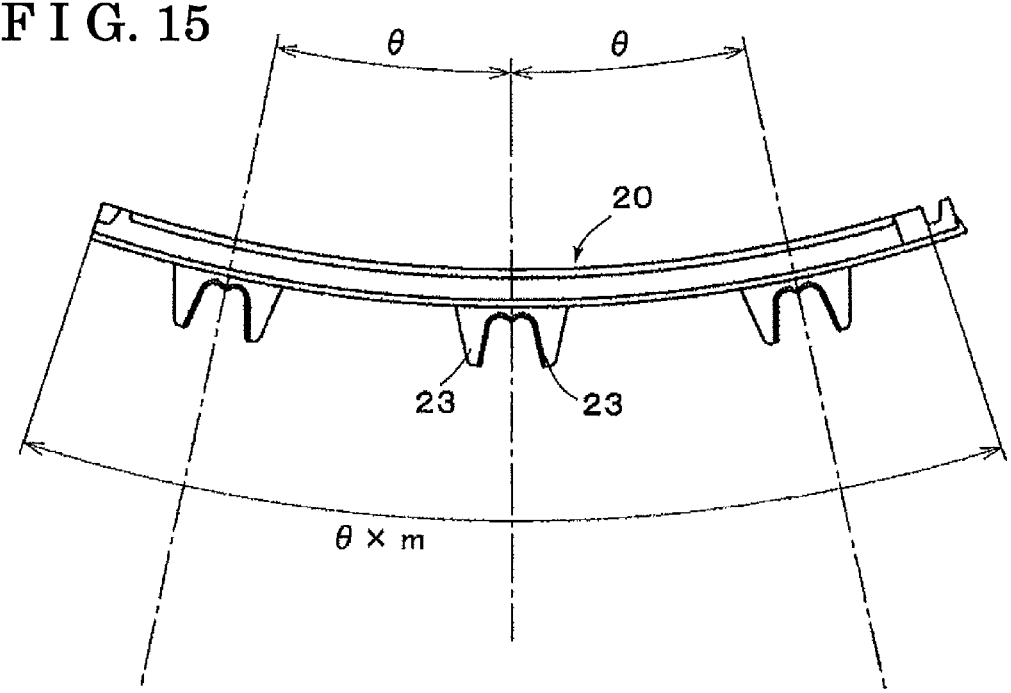
FIG. 15 is a bottom view illustrating angular relationships of the inner clip segment according to the embodiment.
Figure 16:
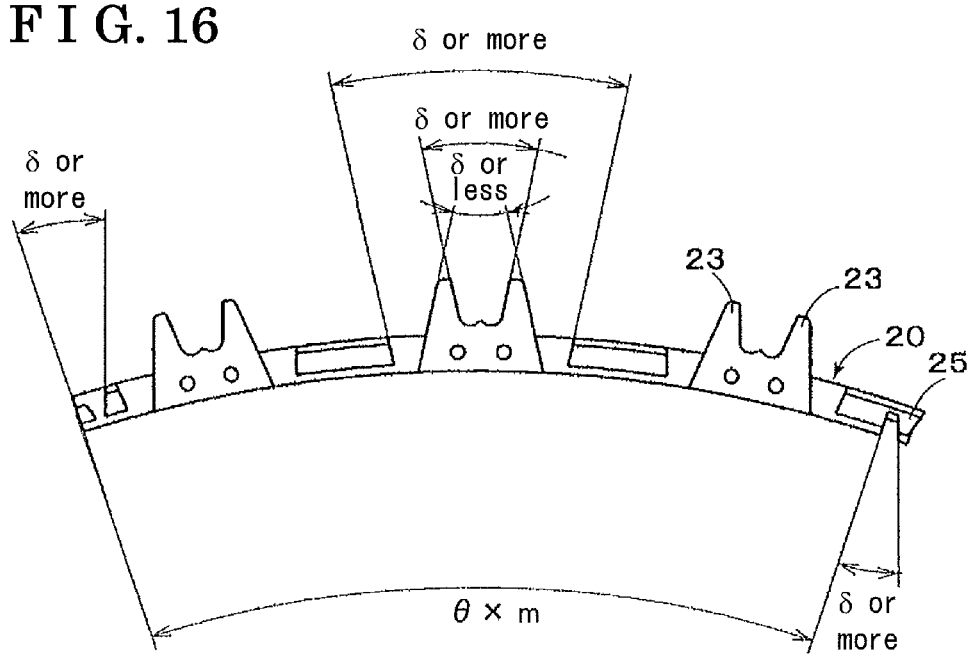
FIG. 16 is a planar view illustrating angular relationships of the inner clip segment according to the embodiment.
Figure 17:
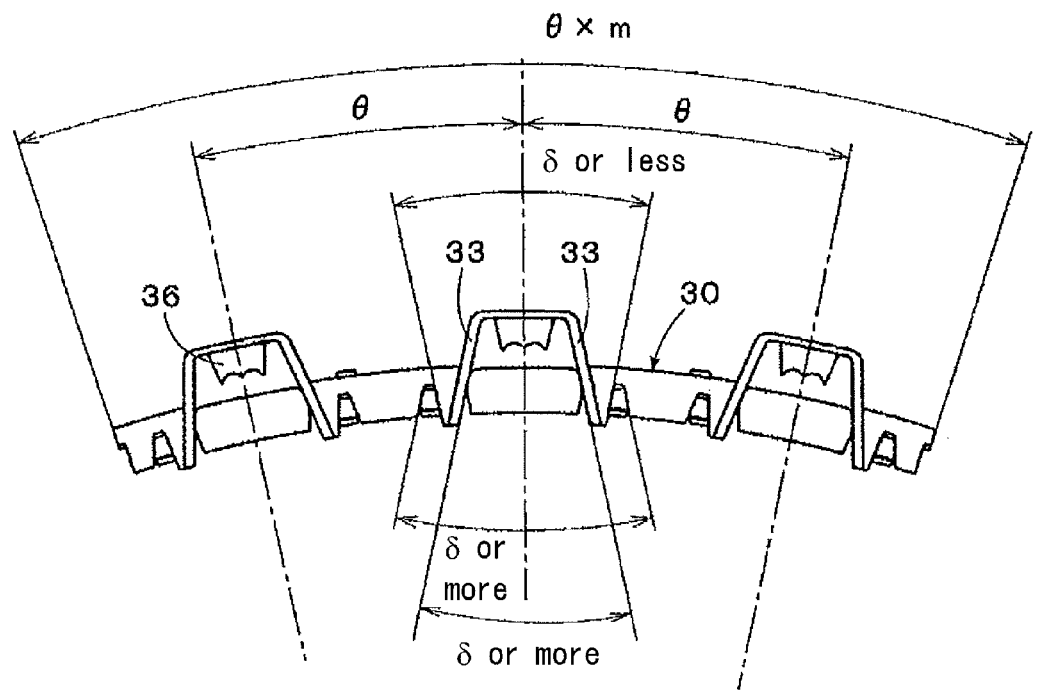
FIG. 17 is a planar view illustrating angular relationships of the outer clip segment according to the embodiment.
Figure 18:
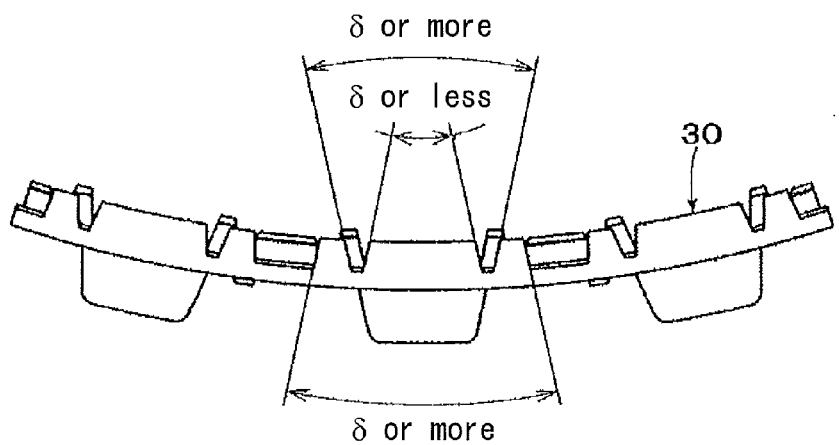
FIG. 18 is a bottom view illustrating angular relationships of the outer clip segment according to the embodiment.

When each of the inner clip segments 20 is formed into a shape shown in FIGS. 15 and 16, the inner clip segments 20 may be formed easily, using a small-sized mold. Further, the cylindrically-shaped sub-assembly of the inner clip 2 may be easily configured. Likewise, when each of the outer clip segments 30 is formed into a shape shown in FIGS. 17 and 18, the outer clip segments 30 may be formed easily, using a small-sized mold. With regard to FIGS. 15 through 18, suppose the number of the motor coils is N, an angle θ is set to be the following equation: θ=360°/N. Further, the angles shown in FIGS. 15 through 18 are set on the basis of an angle δ or an angle γ, each of which is suitable for removing a mold at the time of resin molding. Furthermore, suppose a connecting number of the inner clip segments 20 is m (m=3,for example) and a connecting number of outer clip segments 30 is m (m=3,for example), the angle δ is set to be the following equation: δ=θ×(m−1), and the angle γ is set to be the following equation: γ=θ×m/2.

Accordingly, the plurality of wire segments 10 are arranged in the circumferential direction so as to form the ring-shaped wire coil 1. When the inner clip 2 and outer clip 3 are connected to each other, the wire coil 1 is held between the first holding portions and the second holding portions. Therefore, a complicated bending process may not be required, and the wire segments 10 may be easily formed by means of a simple bending mold. The plurality of such wire segments 10 are arranged in the circumferential direction so as to form the substantially ring-shaped wire coil 1, and the wire coil 1 is surely held between the first holding portions 2u,2v and 2w of the inner clip 2 and the second holding portions 3u,3v and 3w of the outer clip 3. Further, less cost is required for manufacturing the wiring components. Furthermore, only the protruding portions 12 and the upright portions 13 extend outer than the outer circumferential surface of the cylindrically-shaped wire coil 1. Therefore, less space is required, and a spaced portion, generated at a portion other than positions of the protruding potions 12 and the upright portions 13, may be utilized to arrange fixing bolts and the like.

According to the embodiment, the plurality of first holding portions 2u,2v and 2w of the inner clip 2 is the plurality of grooves 2u,2v and 2w formed at the outer circumferential surface of the inner clip 2. The plurality of second holding portions 3u,3v and 3w of the outer clip 3 is the plurality of projecting portions 3u,3v and 3w formed at the inner circumferential surface of the outer clip 3. The inner clip 2 and the outer clip 3 are connected to each other so that the plurality of projecting portions 3u,3v and 3w of the outer clip 3 engages with the plurality of holding portions 2u,2v and 2w of the inner clip 2 so as to hold the wire coil 1, 1u,1v and 1w therebetween.

Accordingly, the plurality of first holding portions 2u,2v and 2w of the inner clip 2 is configured by the plurality of first, second and third grooves 2u,2v and 2w while the plurality of second holding portions 3u,3v and 3w of the outer clip 3 is configured by the plurality of first, second and third projecting portions 3u,3v and 3w.Therefore, the inner clip 2 and the outer clip 3 are easily connected to each other, and the wire coil 1 is surely held between the plurality of first, second and third grooves 2u,2v and 2w and the plurality of first, second and third projecting portions 3u,3v and 3w.

According to the embodiment, the extending lengths of the upright portions 13, at which the adjacent wire segments 10 contact each other in the circumferential direction of the wire segments 10, are set to vary, depending on positions where the wire segments 10 are attached to the plurality of grooves 2u,2v and 2w of the inner clip 2. The upright portions 13 are set to be the same height relative to the planar surface including the main-body portions 11 of the wire segments 10 of the wire coil 1, 1u,1v and 1w,arranged to be closest to a side of the upright portions 13 in an axial direction when the wire coil 1, 1u,1v and 1w is attached to the inner clip 2.

According to the embodiment, the extending length of each of the upright portions 13, at which the adjacent wire segments 10 contact each other, is set to be a predetermined length D or more, and each of the upright portions 13 is cut to be the predetermined length D so that the upright portions 13 become the same height relative to the planar surface including the wire segments 10 of the wire coil 1, 1u,1v and 1w,arranged to be closest to a side of the upright portions 13 in an axial direction when the wire coil 1, 1u,1v and 1w is attached to the inner clip 2.

Accordingly, the wire segments 10 differ from each other only in the extending lengths of the upright portions 13 thereof. Therefore, only cutting lengths of the upright portions 13 may be set to be different, and as a result, the wire segments 10 may be manufactured easily. Alternatively, the wire segments 10 may be formed into the same shape, and unnecessary portions may be cut later. As a result, the wire segments 10 may be manufactured easily.

According to the embodiment, the inner clip 2 is formed with the pair of third holding portions 23 extending from the inner side of the wire coil 1, 1u,1v and 1w to the outer side of the wire coil 1, 1u,1v and 1w in a radial direction thereof, relative to the upright portions 13, at which the adjacent wire segments 10 contact each other in a circumferential direction of the wire coil 1, 1u,1v and 1w.The outer clip 3 is formed with the sandwiching portion 33 extending from the inner side of the wire coil 1, 1u,1v and 1w to the outer side of the wire coil 1, 1u,1v and 1w in a radial direction thereof so as to sandwich the pair of third holding portions 23 from both sides thereof in the circumferential direction of the wire coil 1, 1u,1v and 1w.

According to the embodiment, the sandwiching portion 33 is the pair of vertical wall portions 33 extending in a vertical direction relative to the planar surface including the main-body portions 11 of the wire segments 10.

According to the embodiment, the wiring component for the motor coil further includes the plurality of terminals 40, each of which including the connecting portion 41 electrically connecting the upright portions 13, at which the adjacent wire segments 10 contact each other in the circumferential direction thereof, and at least one extending portion 42, 43 extending from the connecting portion 41 in a radial direction of the wire coil 1, 1u,1v and 1w.The upright portions 13 are electrically connected to each other by means of the terminals 40.

According to the embodiment, the extending portion 42 and 43 is the coil terminal 42 extending in a radially inner direction of the wire coil 1, 1u,1v and 1w so as to be electrically connected to a coil component.

According to the embodiment, the extending portion 42 and 43 is the outer terminal 43 extending in a radially outer direction of the wire coil 1, 1u,1v and 1w so as to be electrically connected to an external component.

Accordingly, the inner clip 2 and outer clip 3 are easily manufactured by a resin-molding. Further, when the upright portions 13 of the wire segments 10 are connected to each other by means of the plurality of terminals 40, the terminals 40 and the wire coil 1 are electrically connected to each other easily and surely, and the misalignment, which may occur at the time of connecting the wire segments 10, may be absorbed. Furthermore, the extending portion 42 and 43 of the terminal 40 may serve as the coil terminals 42 for electrically connecting the terminal 40 to the coil components, or the outer terminals 43 for electrically connecting the terminals 40 to the external components.

According to the embodiment, the outer clip 3 includes the circumferential wall portion 34, which forms a U-shape opening toward a radially inner direction of the outer clip 3 together with the pair of vertical wall portions 33 when seen in a planar view, and the through hole 35, through which the outer terminal 43 is inserted, is formed at the outer circumferential wall portion 34.

According to the embodiment, the wiring component for the motor coil further includes a plurality of terminals 40, each of which includes the connecting portion 41 electrically connecting the upright portions 13, at which the adjacent wire segments 10 contact each other in the circumferential direction thereof. The holding portion 23, 36 holding the upright portions 13 is formed at at least one of the inner clip 2 and the outer clip 3.

Accordingly, the outer terminals 43 may be inserted through the through-hole 35. Therefore, an electrical connection to the external components may be easily established. Furthermore, the fourth holding portions 36 holds the upright portions 13. Therefore, the upright portions 13 may be surely held.

According to the embodiment, the pair of protrusions 24, protruding from both sides of the extending portions 42 and 43, is formed at a surface of the pair of third holding portions 23.

Accordingly, each of the coil terminals 42 is surely held by means of the pair of protrusions 24. As a result, assembly may be executed easily and surely.

According to the embodiment, the inner clip 2 is configured in a manner where the plurality of inner clip segments 20, which are formed by splitting the inner clip 2 in the circumferential direction thereof, is connected so as to form a cylindrical shape, and the outer clip 3 is configured in a manner where the plurality of outer clip segments 30, which are formed by splitting the outer clip 3 in the circumferential direction thereof, is connected so as to form a cylindrical shape.

According to the embodiment, at least one of the inner clip 2 and the outer clip 3 is configured in a manner where the plurality of inner clip segments 20 is respectively connected to each other so as to form a ring shape and the plurality of outer clip segments 30 is respectively connected to each other so as to form a ring shape.

According to the embodiment, the inner clip 2 and the outer clip 3 are respectively configured in a manner where the plurality of inner clip segments 20 is respectively connected to each other so as to form a ring shape and the plurality of outer clip segments 30 is respectively connected to each other so as to form a ring shape. The plurality of inner clip segments 20 and the plurality of outer clip segments 30 are arranged so that the plurality of outer clip segments 30 of the outer clip 3 cover connecting portions of the plurality of inner clip segments 20 of the inner clip 2.

According to the embodiment, one end of each of the plurality of inner clip segments 20 and one end of each of the plurality of outer clip segments 30 in a circumferential direction thereof is formed with the projection 25 and the other end thereof is formed with the recess 25. The plurality of inner clip segments 20, being adjacent to each other in the circumferential direction thereof, are connected to each other by engagement between the projection 25 and the recess 25, and the plurality of outer clip segments 30, being adjacent to each other in the circumferential direction thereof, are connected to each other by engagement between the projection 25 and the recess 25.

Accordingly, a mold for resin molding may be downsized and a cost may be reduced.

According to the embodiment, at least one of the inner clip 2 and the outer clip 3 includes a plurality of holding portions $2u,2v,2w,3u,3v$ and $3w$ for holding the wire coil 1, $1u$, $1v$ and $1w$ arranged in an axial direction of the coil 1, and the wore coil 1, $1u,1v$ and $1w$ is held between the inner clip 2 and the outer clip 3 in the axial direction thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A wiring component for a motor coil comprising:
   a wire coil configured by a plurality of wire segments arranged in a circumferential direction so as to form a ring shape, each of the wire segments including an arc-shaped main-body portion made of a conductive wire rod bent in an arc shape, protruding portions formed at both end portions of the main-body portion in a manner of bending both end portions of the main-body portion in a radial direction, and upright portions respectively formed at end portions of the protruding portions in a manner of bending one of end portions of each of the protruding portions at positions where the protruding portions protrude in a radial direction by a length longer than a diameter of the conductive wire rod, so that the upright portions protrude in a direction vertical relative to a planar surface including the main-body portion;
   an inner clip formed with a plurality of first holding portions at an outer circumferential surface of the inner clip; and
   an outer clip formed with a plurality of second holding portions at an inner circumferential surface of the outer clip, wherein
   the inner clip and the outer clip are connected to each other so as to hold the wire coil between the first holding portions and the second holding portions.

2. The wiring component for the motor coil according to claim 1, wherein
   the plurality of first holding portions of the inner clip is a plurality of grooves formed at the outer circumferential surface of the inner clip,
   the plurality of second holding portions of the outer clip is a plurality of projecting portions formed at the inner circumferential surface of the outer clip, and wherein
   the inner clip and the outer clip are connected to each other so that the plurality of projecting portions of the outer clip engages with the plurality of holding portions of the inner clip so as to hold the wire coil therebetween.

3. The wiring component for the motor coil according to claim 1, wherein
   extending lengths of the upright portions, at which the adjacent wire segments contact each other in the circumferential direction of the wire segments, are set to vary, depending on positions where the wire segments are attached to the plurality of grooves of the inner clip, and wherein
   the upright portions are set to be the same height relative to the planar surface including the main-body portions of the wire segments of the wire coil, arranged to be closest to a side of the upright portions in an axial direction when the wire coil is attached to the inner clip.

4. The wiring component for the motor coil according to claim 1, wherein
   an extending length of each of the upright portions, at which the adjacent wire segments contact each other, is set to be a predetermined length or more, and
   each of the upright portions is cut to be the predetermined length so that the upright portions become the same height relative to the planar surface including the wire segments of the wire coil, arranged to be closest to a side of the upright portions in an axial direction when the wire coil is attached to the inner clip.

5. The wiring component for the motor coil according to claim 1, wherein
   the inner clip is formed with a pair of third holding portions extending from an inner side of the wire coil to an outer side of the wire coil in a radial direction thereof, relative to the upright portions, at which the adjacent wire segments contact each other in a circumferential direction of the wire coil, and
   the outer clip is formed with a sandwiching portion extending from an inner side of the wire coil to an outer side of the wire coil in a radial direction thereof so as to sandwich the pair of third holding portions from both sides thereof in the circumferential direction of the wire coil.

6. The wiring component for the motor coil according to claim 5 wherein
   the sandwiching portion is a pair of vertical wall portions extending in a vertical direction relative to the planar surface including the main-body portions of the wire segments.

7. The wiring component for the motor coil according to claim 1, further comprising:
   a plurality of terminals, each of which including a connecting portion electrically connecting the upright portions, at which the adjacent wire segments contact each other in the circumferential direction thereof, and at least one extending portion extending from the connecting portion in a radial direction of the wire coil, wherein
   the upright portions are electrically connected to each other by means of the terminals.

8. The wiring component for the motor coil according to claim 7, wherein
   the extending portion is a coil terminal extending in a radially inner direction of the wire coil so as to be electrically connected to a coil component.

9. The wiring component for the motor coil according to claim 7, wherein
   the extending portion is an outer terminal extending in a radially outer direction of the wire coil so as to be electrically connected to an external component.

10. The wiring component for the motor coil according to claim 9, wherein
    the outer clip includes a circumferential wall portion, which forms a U-shape opening toward a radially inner direction of the outer clip together with the pair of vertical wall portions when seen in a planar view, and
    a through hole, through which the outer terminal is inserted, is formed at the outer circumferential wall portion.

11. The wiring component for the motor coil according to claim 5 further comprising:
    a plurality of terminals, each of which includes a connecting portion electrically connecting the upright portions, at which the adjacent wire segments contact each other in the circumferential direction thereof, wherein
    a holding portion holding the upright portions is formed at least one of the inner clip and the outer clip.

12. The wiring component for the motor coil according to claim 7, wherein
    a pair of protrusions, protruding from both sides of the extending portions, is formed at a surface of the pair of third holding portions.

13. The wiring component for the motor coil according to claim 1, wherein
    the inner clip is configured in a manner where a plurality of first members, which are formed by splitting the inner clip in a circumferential direction thereof, is connected so as to form a cylindrical shape, and
    the outer clip is configured in a manner where a plurality of second members, which are formed by splitting the outer clip in a circumferential direction thereof, is connected so as to form a cylindrical shape.

14. The wiring component for the motor coil according to claim 1, wherein
    at least one of the inner clip and the outer clip is configured in a manner where a plurality of arc-shaped segments is connected to each other so as to form a ring shape.

15. The wiring component for the motor coil according to claim 13, wherein
    the inner clip and the outer clip are respectively configured in a manner where the plurality of arc-shaped segments is connected to each other so as to form a ring shape, and
    the arc-shaped segments are arranged so that the arc-shaped segments of the outer clip cover connecting portions of arc-shaped segments of the inner clip.

16. The wiring component for the motor coil according to claim 14, wherein
    one end of each of the arc-shaped segments in a circumferential direction thereof is formed with a projection and the other end thereof is formed with a recess, and
    the arc-shaped segments, being adjacent to each other in the circumferential direction thereof, are connected to each other by engagement between the projection and the recess.

* * * * *